May 31, 1966

D. S. CVACHO 3,253,520

INLINE METHOD AND APPARATUS FOR MAKING TUBULAR CONTAINER
BODIES AND THE LIKE

Filed March 6, 1963

INVENTOR.
DANIEL S. CVACHO

BY
Glenn, Palmer
& Matthews

HIS ATTORNEYS

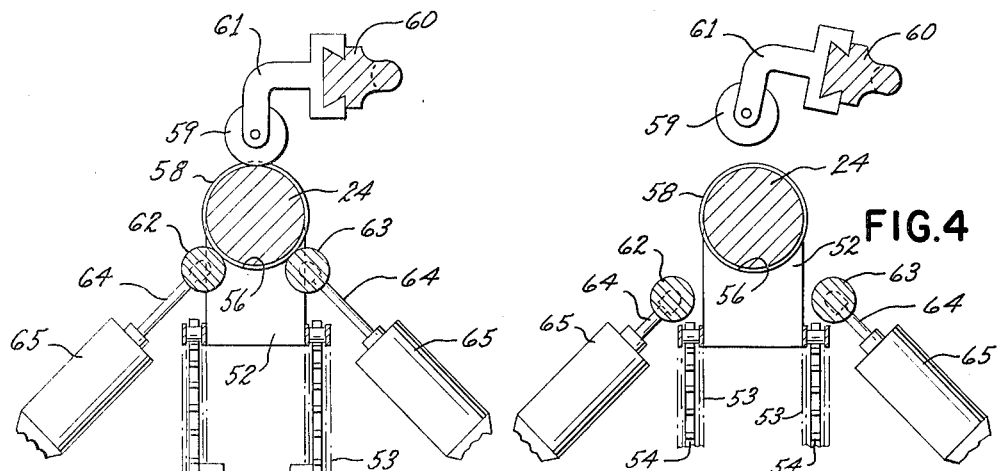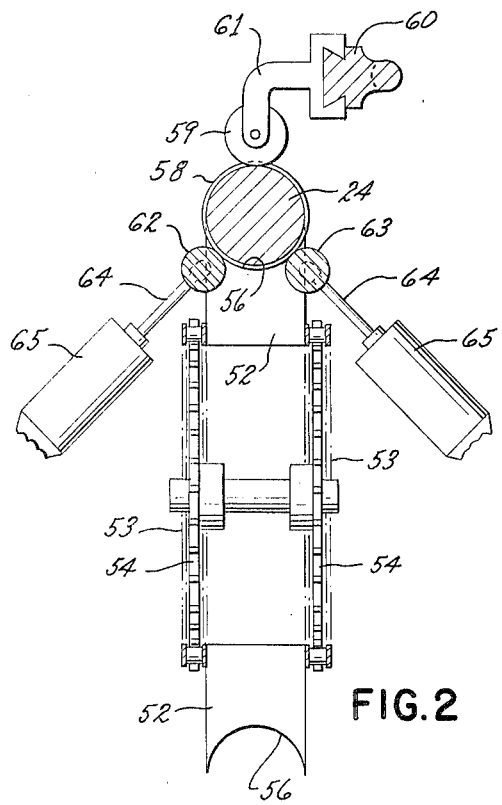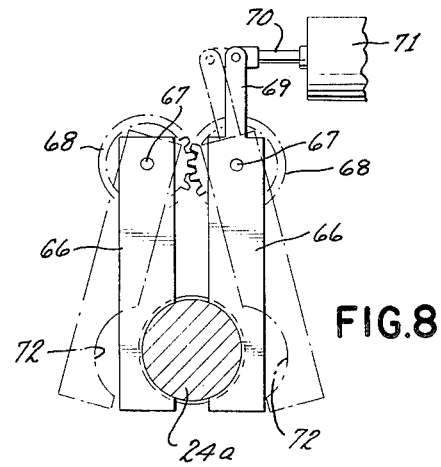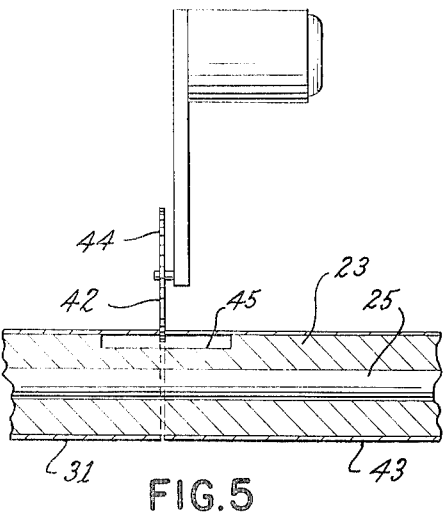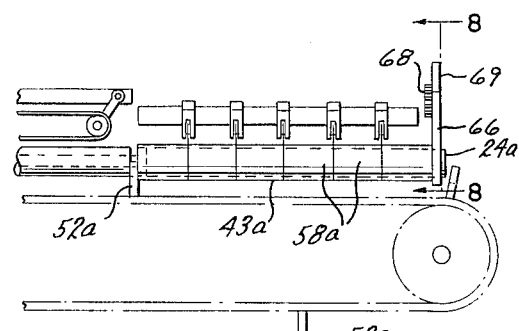

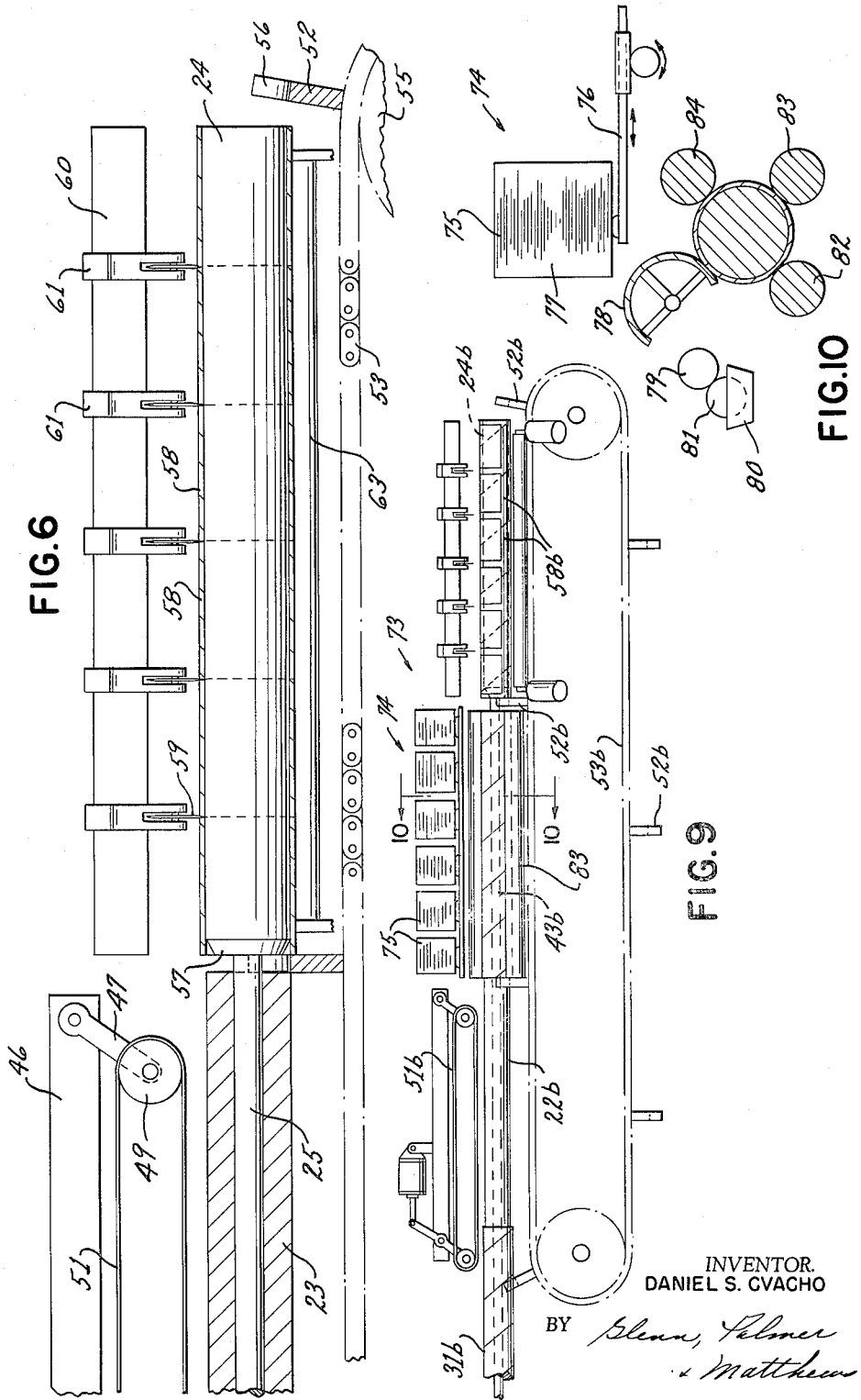

3,253,520
INLINE METHOD AND APPARATUS FOR MAKING TUBULAR CONTAINER BODIES AND THE LIKE
Daniel S. Cvacho, Chesterfield County, Va., assignor to Reynolds Metals Company, Richmond, Va., a corporation of Delaware
Filed Mar. 6, 1963, Ser. No. 263,301
17 Claims. (Cl. 93—80)

This invention relates to an improved method and apparatus for making individual tubular members, such as individual helically wound container bodies or the like.

It is well known that a continuous length of tubular container body stock can be continuously formed by continuously and helically winding strips of container material on a forming mandrel. The tubular container body stock is continuously advanced on the forming mandrel and can be cut into desired lengths on the forming mandrel.

However, it has been found that such tubular container body stock should be first cut into elongated lengths or logs of two or more container bodies so that the same can be subsequently dried and cured before the same are cut into the individual container bodies.

This method requires that the cut logs of tubular container body stock be removed from the forming mandrel to be dried before the same was cut into individual container bodies by a separate apparatus.

However, according to the teachings of this invention, an improved method and apparatus are provided wherein the elongated lengths or logs of tubular container body stock can be formed in an inline relation with the stock forming apparatus and are subsequently cut into individual container bodies in an inline relation after the elongated lengths of tubular container body stock have been suitably cured and dried.

Further, one embodiment of this invention provides a method and apparatus for producing the above inline operation while at the same time providing properly spaced labels on the individual container bodies.

In addition, it has been found that in prior known inline methods and apparatus wherein the continuously rotating and axially advancing tubular body stock is serially cut into individual tubular members or container bodies, the prior known cutting means get only up to three revolutions of the tubular stock under the cutting knife for each cut whereby a clean cut is not provided. Further, since the prior known cutting means only gets about three revolutions under the cutting knife, an excessive length of stroke to the prior known cut off mechanism is provided whereby engineering problems are created to form a satisfactory apparatus.

However, according to the teachings of this invention, a high speed cutting operation is provided for forming the individual tubular members wherein the tubular stock has a great number of revolutions under the cutting knife or knives. For example, one embodiment of this invention causes the tubular stock to rotate from fifteen to twenty or more revolutions for each cutting stroke of the knife means whereby a cleaner cut is provided and the length of stroke is appreciably shortened.

Thus, it can be seen that not only does this invention provide an improved inline method and apparatus for forming individual tubular members in a high speed operation, but also this invention provides a method and apparatus that provides a cleaner cut for the bodies than in the past with a shorter stroke of the cutting mechanism.

Accordingly, it is an object of this invention to provide an improved method for making tubular members or the like, the method having one or more of the novel features set forth above or hereinafter shown or described.

Another object of this invention is to provide an improved apparatus for making such tubular members or the like, the apparatus having one or more of the novel features set forth above or hereinafter shown or described.

Other objects, uses and advantages of this invention are apparent from a reading of this description which proceeds with reference to the accompanying drawing forming a part thereof and wherein:

FIGURE 2 is an enlarged, fragmentary, cross-sectional view taken on line 2—2 of FIGURE 1.

FIGURE 4 is a view similar to FIGURE 2 and is taken on line 4—4 of FIGURE 3.

FIGURE 5 is an enlarged, fragmentary cross-sectional view of the first cutoff means of the apparatus illustrated in FIGURE 1.

FIGURE 6 is an enlarged, fragmentary, cross-sectional view of the end portion of the apparatus illustrated in FIGURE 1.

FIGURE 7 is a view similar to FIGURE 6 and illustrates another embodiment of this invention.

FIGURE 8 is an enlarged, fragmentary, cross-sectional view taken on line 8—8 of FIGURE 7.

FIGURE 9 is a fragmentary view similar to FIGURE 1 and illustrates another embodiment of this invention.

FIGURE 10 is an enlarged, fragmentary, cross-sectional view taken on line 10—10 of FIGURE 9.

Figure 1:
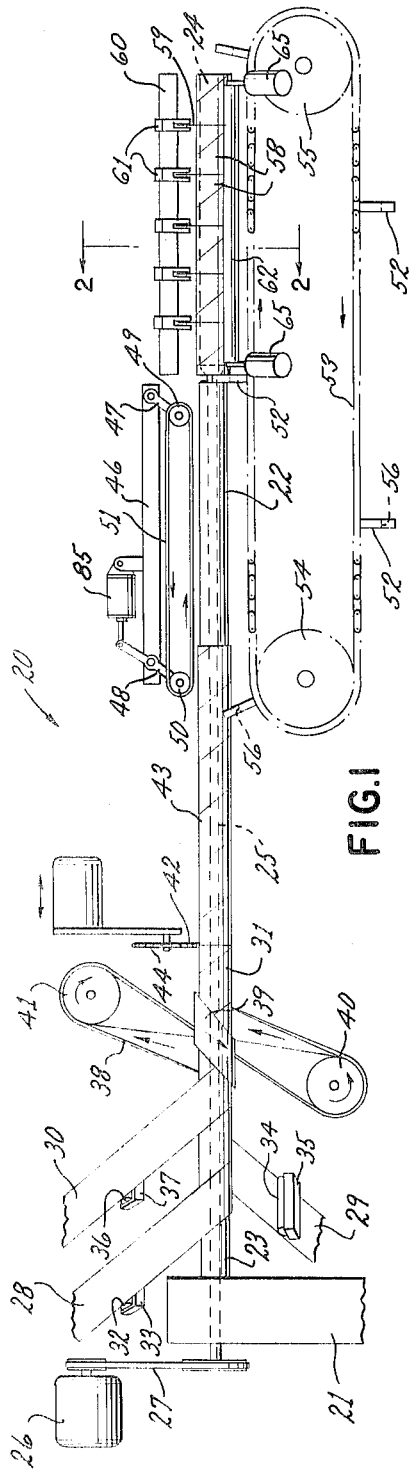
FIGURE 1 is a schematic side view illustrating one method and apparatus of this invention.

While the various features of this invention are hereinafter described and illustrated as being particularly adaptable for making helically wound container bodies or the like, it is to be understood that the various features of this invention can be utilized singly or in any combination thereof to provide other tubular members as desired.

Therefore, this invention is not to be limited to only the embodiments illustrated in the drawings, because the drawings are merely utilized to illustrate one of the wide variety of uses of this invention.

Figure 3:
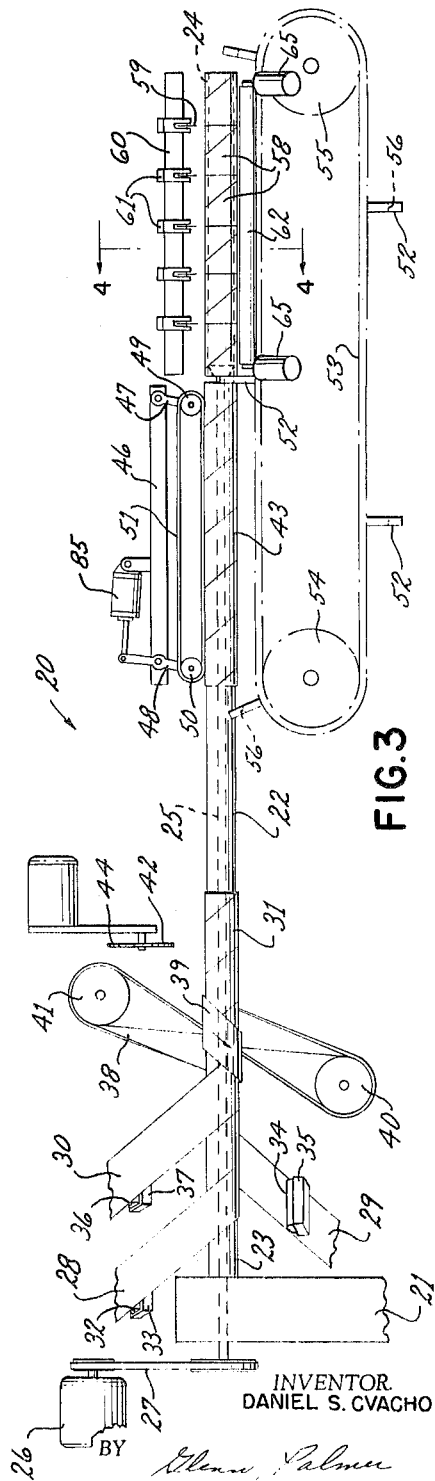
FIGURE 3 is a view similar to FIGURE 1 illustrating the apparatus in another operating position thereof.

Referring now to FIGURES 1 and 3, an improved inline method and apparatus of this invention for making individual tubular container bodies is generally indicated by the reference numeral 20.

Generally, the apparatus 20 comprises a support means 21 carrying a mandrel means 22 in cantilevered fashion, the mandrel means 22 comprising a forming mandrel 23 and a rotatable mandrel 24 carried on a shaft 25 passing through the forming mandrel 23 and being adapted to be rotated relative to the forming mandrel 23 by a motor means 26 interconnected thereto by a driving pulley arrangement 27.

One or more strips of container body material, such as strips 28, 29 and 30, are adapted to be drawn from free wheeling supply rolls (not shown) onto the forming mandrel to continuously form tubular container body stock 31 in a conventional manner.

For example, the strip of material 28 can comprise a suitable lining material, such as lamination of aluminum foil and a paper backing material, whereby the lining material 28 has the foil side thereof forming the interior surface of the container body stock 31. The strip of lining material 28 is continuously helically wound on the forming mandrel 23 in a manner hereinafter described whereby adjacent edges of adjacent convolutions thereof can be disposed in overlapping relation, the overlapping edges of the strip of lining material 28 being secured together by a suitable adhesive being applied thereto by an adhesive applicator roller 32 receiving the adhesive from a reservoir 33.

Thereafter, one or more strips of paper board material 29 or the like are helically wound onto the helically wound strip of lining material 28 to build up the container body stock 31 to the desired thickness and strength, the strips of container body material 29 having a suitable adhesive placed on the under surfaces by applicator rollers 34 receiving the adhesive from reservoirs 35 to secure the material 29 to the helically wound strip of lining material 28.

Subsequently, a strip of labeling material 30 is helically wound onto the paper board material 29 to complete the container body stock 31, the strip of labeling or wrapping material 30 having adjacent edges thereof disposed in overlapping relation and being secured to the container body material 29 by a layer of adhesive being applied thereto by an adhesive applicator roller 36 receiving adhesive from a reservoir 37.

In order to continuously draw the strips of material 28, 29 and 30 onto the forming mandrel 23 to continuously form the tubular stock 31, some means must be provided to continuously rotate and axially advance the tubular stock 31 to the right on the mandrel means 22.

One such means comprises a continuous crossed belt 38 having a portion 39 thereof looped around the container body stock 31 whereby movement of the belt 38 in the direction indicated by the arrows causes the container body stock 31 to continuously rotate and axially advance to the right on the mandrel means 22 to continuously form the container body stock 31 in a manner well known in the art, the crossed belt 38 passing around a pair of suitable pulleys 40 and 41 driven in unison in any suitable manner.

As previously set forth, it is preferred that the thus formed container body stock 31 be subsequently cured or dried before the same is cut into individual container bodies.

However, in order to form such curing operation, it was heretofore necessary to cut the container body stock 31 into elongated lengths or logs and remove the same from the forming apparatus in order to cure and dry the same whereby an additional operation was required to subsequently cut the cured logs into individual container bodies.

However, the apparatus and method of this invention now to be described provides a means whereby individual container bodies can be formed in line with the forming apparatus for the container body stock 31 while still permitting the container body stock 31 to be cured and dried.

In particular, a suitable cutter 42 is provided for serially cutting the rotating and axially advancing tubular stock 31 into elongated lengths or logs 43, each log 43 having a length equal to two or more individual container bodies for a purpose hereinafter described.

The cutting means 42 comprises a rotatable and reciprocal cutting blade 44 adapted to be moved radially inwardly toward the forming mandrel 23 while at the same time being axially advanced to the right at the same rate as the rate of axial advancement of the tubular body stock 31 to the right. The forming mandrel 23 has a suitable slot 45, FIGURE 5, formed therein to permit the cutting blade 44 to cut through the container body stock 31 to completely sever a log 43 therefrom even though the container body stock 31 is being continuously formed and being continuously advanced to the right on the mandrel 23.

After a log 43 has been cut from the tubular body stock 31 in the above manner, the same is adapted to be axially advanced to the right on the mandrel means 22 at a rate faster than axial movement of the container body stock 31 to the right in a manner hereinafter to be described.

As illustrated in FIGURES 1 and 3, a suitable support 46 is provided adjacent the mandrel means 22 and pivotally carries a pair of links 47 and 48 respectively pivotally connected to a pair of rollers 49 and 50, at least one of the rollers 49 and 50 being adapted to be rotatably driven in the desired direction for a purpose hereinafter described.

A continuous belt 51 is looped around the rollers 49 and 50 and is adapted to be continuously driven in the direction indicated by the arrows in FIGURE 1 by the rollers 49 and 50.

The belt 51 is adapted to be moved into engagement with the cut log 43 by a piston and cylinder arrangement 85 carried by the support means 46 and interconnected to the link 48 whereby frictional engagement of the belt 51 with the log 43 causes the log 43 to be rapidly advanced to the right on the mandrel means 22 because of the continuous movement of the belt 51. In this manner, the log 43 is adapted to be axially advanced to the right at a rate faster than axial movement of the container body stock 31.

Movement of the log 43 to the right by the belt means 51 is terminated when the leading end of the log 43 is brought by the belt 51 against a stop member 52 carried by a continuous chain 53 looped around a pair of rotatably mounted sprockets 54 and 55, at least one of the sprockets 54 or 55 being adapted to be rotatably driven in a manner hereinafter described by suitable mechanism.

A plurality of stop members 52 are carried by the chain 53 in a suitable spaced relation about the same. Each stop member or pusher 52 has the upper end formed with a semi-circular cutout 56 so that when the same is angularly disposed relative to the mandrel means 22 in the manner illustrated by the left-hand pusher 52 in FIGURE 1, the log 43 can be axially advanced relative thereto by the belt 51.

The chain 53 is driven in such a manner that the same moves in a direction indicated by the arrows to position one stop member 52 at the proper location between the mandrels 23 and 24 whereby a log 43 can be axially advanced against that particular stop member 52 by the belt 51 in the manner illustrated in FIGURE 3.

With the log 43 disposed in a position illustrated in FIGURE 3, the same can remain stationary and be suitably cured and dried by any suitable drying apparatus even though the container body stock 31 is being continuously formed on the forming mandrel 23.

After the log 43 has been suitably cured, the same is axially advanced onto the cutting mandrel 24 by movement of the chain 53 in the proper direction so that a pusher 52 comes into contact with the trailing end of the log 43 and pushes the same to the right onto the mandrel 24 to the position illustrated in FIGURE 1 whereby the chain 53 again stops in the proper position to properly register the log 43 on the cutting mandrel 24, the cutting mandrel 24 having a beveled edge 57, FIGURE 6, to facilitate movement of the log 43 onto the mandrel 24 by movement of the pusher 52.

When the log 43 has been properly positioned on the cutting mandrel 24 by the pusher 52, movement of the chain 53 is terminated and suitable means are utilized to cut the log 43 into individual container bodies 58.

For example, a plurality of cutting knives 59 are carried in properly spaced relation on a pivotally movable bar 60 by a plurality of links 61, FIGURE 2, so that pivotal movement of the bar 60 in the proper direction brings the cutting knives 59 into contact with the log 43 in the manner illustrated in FIGURE 2. Because the log 43 is being rotated at a desired speed by rotation of the cutting mandrel 24, the knives 59 cut the log 43 into individual container bodies 58 in the manner illustrated in FIGURES 1 and 2.

In order to back up the cutting knives 59, a pair of rollers 62 and 63 are respectively carried on piston rods 64 which are hydraulically moved by actuators 65 toward the cutting mandrel 24 at the same time that the cutting knives 59 are moved against the log 43 in the manner illustrated in FIGURE 2 to support the cutting mandrel 24 during the cutting operation.

After the particular log 43 has been cut into the individual container bodies 58, the knives 59 are moved radially outwardly in the manner illustrated in FIGURE 4 while the back-up rollers 62 and 63 are moved radially outwardly to permit the cut container bodies 58 to be removed from the mandrel means 22 upon movement of the chain 53 in the proper direction, such removal of the individual container bodies 58 being effected by the pusher 52 pushing the same off the free end of the mandrel 24 while an adjacent pusher 52 moves another cut and cured log 43 onto the cutting mandrel 24 in the manner previously described.

Therefore, it can be seen that this invention provides an improved method and apparatus for continuously forming individual container bodies 58 in an inline relation with the apparatus forming the container body stock 31 even though a subsequent curing and drying operation takes place. In this manner, a more efficient and automatic method and apparatus is provided over the prior known methods of making such individual container bodies.

While one means has been illustrated in FIGURES 1 and 3 for supporting the cutting mandrel 24 during the cutting operation, it is to be understood that other supporting means can be utilized.

For example, reference is made to FIGURES 7 and 8 wherein another embodiment of this invention is provided and parts thereof similar to the apparatus 20 are indicated by like reference numerals followed by the reference letter "a."

As illustrated in FIGURES 7 and 8, a pair of arms 66 are respectively pivotally carried at one of the ends thereof by shafts 67 respectively interconnected to meshing gears wheels 68, the right-hand arm 66 having an extension 69 pivotally secured to a piston rod 70 of a hydraulic actuator 71 whereby movement of the piston rod 70 causes the arms 66 to move respectively about their pivot 67 for a purpose now to be described.

Each arm 66 has a substantially semi-circular cutout 72 adapted to mate with the end of the cutting mandrel 24a when the same are moved inwardly thereagainst in the manner illustrated in full lines in FIGURE 8.

In this manner, the arms 66 are not only utilized to support the cutting mandrel 24a when the same are disposed in the full-line position of FIGURE 8, but also the arms 66 also provide means for stopping further axial movement of the log 43a to the right on the cutting mandrel 24a so as to properly position the log 43a on the cutting mandrel 24a.

After the log 43a has been cut on the cutting mandrel 24a in the manner previously described, the arms 66 are moved to the dotted position illustrated in FIGURE 8 whereby the cut individual container bodies 58a can be removed from the cutting mandrel 24a by the pusher 52a in the manner previously described while another log 43a is being moved onto the cutting mandrel 24a in the manner previously described.

In order to properly register the labeling material 30 relative to the cutting means in the embodiments illustrated in FIGURES 1 and 7, a suitable electric eye arrangement can be utilized to control the operation of the cutter 42 so that the labeling information on the cut logs 43 will be properly registered relative to the cutting knives 59 so that the labels subsequently appearing on the individual container bodies 58 will be properly located relative to the ends thereof.

However, such electric eye means can be eliminated if the labeling means is applied to the logs 43 in the manner provided in the embodiment of this invention illustrated in FIGURES 9 and 10.

In particular, the apparatus and method 73 illustrated in FIGURES 9 and 10 has the parts thereof similar to the apparatus 20 indicated by like reference numerals followed by the reference letter "b."

The tubular body stock 31b is formed in substantially the same manner as the stock 31 previously described except that the same does not have the strip of labeling material 30 applied thereto. Instead, the strip of material 30 can provide a protective wrapper without having any informational media printed thereon.

The logs 43b in the apparatus 73 are cut in the same manner as the logs 43 in the apparatus 20 previously described and are axially advanced away from the container body stock 31 by the belt means 51b in the manner previously described.

However, the belt means 51b does not deliver the cut logs 43b adjacent the cutting mandrel 24b, but instead disposes the same against a stop member 52b located a suitable distance away from the cutting mandrel 24b for a purpose now to be described.

After the log 43b has been delivered against the stop member 52b by the belt means 51b, the previously described drying and curing operation takes place. Thereafter, the chain 53b is advanced in the manner previously described so that a trailing pusher 52b engages the cured log 43b and moves the same to the position illustrated in FIGURE 9 whereby further movement of the chain 53b is terminated.

With the cured log 43b now disposed in the position illustrated in FIGURE 9, a suitable labeling apparatus 74 is utilized to apply labeling means to the log 43. For example, the labeling apparatus 74 can be utilized to provide a plurality of labels on the log 43 or one continuous label as desired.

As illustrated in FIGURES 9 and 10, the labeling apparatus 74 disposes a plurality of labels 75 on the logs 43b in the proper position along the length thereof.

In particular, a suitable vacuum pick-up member 76 for each stack 77 of labels 75 removes a label 75 and places the same on a label applier 78 that rotates past an adhesive applicator roller 79 receiving suitable adhesive from a reservoir 80 by a transverse roller 81.

After the label 75 has passed beyond the applicator roller 78, the label applier 78 comes into engagement with the log 43 and applies the label thereon, the log 43 rotating in unison with the applier 78 so that the label 75 is properly applied to the log 43b as the log 43b is backed up and rotated by suitable drive rollers 82, 83 and 84.

Therefore, it can be seen that a plurality of labels 75 can be applied to the log 43 while the same is disposed adjacent the labeling apparatus 74.

Subsequently, the chain 53b is driven in a suitable manner to cause the trailing pusher 52b to move the labeled log 43b to the right on the mandrel means 22b until the same is properly disposed on the cutting mandrel 24b whereby further movement of the chain 53b is terminated until the labeled log 43b has been cut into the individual container bodies 58b in the manner previously described.

Thereafter, the cut labeled container bodies 58b are removed from the cutting mandrel 24b by further movement of the trailing pusher 52b to the right while another label log 43b is being positioned onto the cutting mandrel 24b in the manner previously described.

Therefore, it can be seen that the method and apparatus illustrated in FIGURES 9 and 10 is adapted to properly register labeling means on the logs 43b so that the logs 43b can be subsequently cut into individual container bodies 58b with the labels 75 properly positioned thereon without requiring the use of expensive electric eye beam control apparatus or the like.

Accordingly, it can be seen that this invention provides an improved inline method and apparatus for forming tubular members or the like.

While the form of the invention now preferred has been disclosed as required by the statutes, other forms may be used, all coming within the scope of the claims which follow.

What is claimed is:

1. An inline apparatus for making tubular members comprising means for continuously making tubular stock, means for serially cutting said tubular stock into elongated lengths, means for placing label means on each cut elongated length, and means for serially cutting said labeled elongated lengths into individual tubular members.

2. An inline apparatus for making tubular members comprising means for continuously making tubular stock so that said tubular stock continuously moves in one direction, means for serially cutting said tubular stock into elongated lengths, means for serially advancing each elongated length away from said cutting means at a rate faster than movement of said tubular stock in said one direction, means for placing label means on each advanced elongated length, and means for serially cutting said advanced and labeled elongated lengths into individual tubular members.

3. An inline apparatus for making tubular members comprising means for continuously making tubular stock so that said tubular stock continuously moves in one direction, means for serially cutting said tubular stock into elongated lengths, first means for serially advancing each elongated length away from said cutting means to a first station at a rate faster than movement of said tubular stock in said one direction, second means for serially moving each elongated length from said first station to a second station, said second means including movable pushers that respectively engage one end of said elongated lengths at said first station and push said elongated lengths to said second station, and means for serially cutting each elongated length into individual tubular members at said second station.

4. An inline apparatus for making tubular members comprising mandrel means, means for continuously making tubular stock on said mandrel means so that said tubular stock continuously moves on said mandrel means in one direction, means for serially cutting said tubular stock on said mandrel means into elongated lengths, means for serially advancing each elongated length away from said cutting means in said one direction and on said mandrel means at a rate faster than movement of said tubular stock in said one direction, means for placing label means on each advanced elongated length, and means for serially cutting each said advanced and labeled elongated length on said mandrel means into individual tubular members.

5. An inline apparatus as set forth in claim 4 wherein said advancing means includes moving belt means.

6. An inline apparatus as set forth in claim 4 wherein said means for cutting said elongated lengths into individual tubular members includes means to rotate part of said mandrel means.

7. An inline method for making tubular members comprising the steps of continuously making tubular stock so that said tubular stock continuously moves in one direction, serially cutting said tubular stock into elongated lengths with cutting means, serially advancing each elongated length away from said cutting means at a rate faster than movement of said tubular stock in said one direction, placing label means on each advanced elongated length, and serially cutting said advanced and labeled elongated lengths into individual tubular members.

8. An inline method for making tubular members comprising the steps of continuously making tubular stock on a mandrel means so that said tubular stock continuously moves on said mandrel means in one direction, serially cutting said tubular stock on said mandrel means into elongated lengths with cutting means, serially advancing each elongated length from said cutting means in said one direction and on said mandrel means at a rate faster than movement of said tubular stock in said one direction, placing label means on each advanced elongated length, and serially cutting each said advanced and labeled elongated length on said mandrel means into individual tubular members.

9. An inline method as set forth in claim 8 wherein said step of advancing said elongated length away from said cutting means includes moving a continuously moving belt means into contact with said elongated lengths.

10. An inline method as set forth in claim 8 wherein said step of cutting said elongated lengths into individual tubular members includes the step of rotating part of said mandrel means.

11. An inline apparatus for making tubular members comprising means for continuously making tubular stock so that said tubular stock continuously moves in one direction, means for serially cutting said tubular stock into elongated lengths, means for serially advancing each elongated length away from said cutting means to a first station at a rate faster than movement of said tubular stock in said one direction, means for placing label means on each cut elongated length of tubular stock at said first station, second means for serially moving each elongated length from said first station to a second station, and means for serially cutting each elongated length into individual tubular members at said second station whereby each individual tubular member has a label thereon.

12. An inline apparatus for making tubular members comprising mandrel means, means for continuously making tubular stock on said mandrel means so that said tubular stock continuously moves on said mandrel means in one direction, means for serially cutting said tubular stock on said mandrel means into elongated lengths, first means for serially advancing each elongated length away from said cutting means in said one direction and on said mandrel means to a first station on said mandrel means at a rate faster than movement of said tubular stock in said one direction, means for placing label means on each elongated length of tubular stock at said first station, second means for serially advancing each elongated length away from said first station in said one direction and on said mandrel means to a second station on said mandrel means, and means for serially cutting each elongated length at said second station into individual tubular members whereby each individual tubular member has a label thereon.

13. An inline apparatus for making tubular members comprising mandrel means, means for continuously making helically wound tubular stock on said mandrel means from webs of material so that tubular stock continuously rotates and axially advances on said mandrel means in one direction, means for serially cutting said tubular stock on said mandrel means into elongated lengths, first means for serially and axially advancing each elongated length away from said cutting means in said one direction and on said mandrel means to a first station on said mandrel means at a rate faster than movement of said tubular stock in said one direction, means for placing label means on each elongated length of tubular stock at said first station, second means for serially and axially advancing each elongated length away from said first station in said one direction and on said mandrel means to a second station on said mandrel means, and means for serially cutting each elongated length at said second station into individual tubular members whereby each individual tubular member has a label thereon.

14. An inline method for making tubular members comprising the steps of continuously making tubular stock so that said tubular stock continuously moves in one direction, serially cutting said tubular stock into elongated lengths with cutting means, serially advancing each elongated length away from said cutting means to a first station at a rate faster than movement of said tubular stock in said one direction by a first means, placing label means on each cut elongated length of tubular stock at said first station, serially moving each elongated length from said first station to a second station by a second means, and serially cutting each elongated length into individual tubular members at said second station whereby each individual tubular member has a label thereon.

15. An inline method for making tubular members comprising the steps of continuously making tubular stock on a mandrel means so that said tubular stock continuously moves on said mandrel means in one direction, serially cutting said tubular stock on said mandrel means into elongated lengths with cutting means, serially advancing each elongated length away from said cutting means in said one direction and on said mandrel means to a first station on said mandrel means at a rate faster than movement of said tubular stock in said one direction by a first means, placing label means on each elongated length of tubular stock at said first station, serially advancing each elongated length away from said first station in said one direction and on said mandrel means to a second station on said mandrel means by a second means, and serially cutting each elongated length at said second station into individual tubular members whereby each individual tubular member has a label thereon.

16. An inline method for making tubular members comprising the steps of continuously making helically wound tubular stock on a mandrel means from webs of materials so that said tubular stock continuously rotates and axially advances on said mandrel means in one direction, serially cutting said tubular stock on said mandrel means into elongated lengths with cutting means, serially and axially advancing each elongated length away from said cutting means in said one direction and on said mandrel means to a first station on said mandrel means at a rate faster than movement of said tubular stock in said one direction by a first means, placing label means on each elongated length of tubular stock at said first station, serially and axially advancing each elongated length away from said first station in said one direction and on said mandrel means to a second station on said mandrel means by a second means, and cutting each elongated length at said second station into individual tubular members whereby each individual tubular member has a label thereon.

17. An inline apparatus for making tubular members comprising mandrel means, means for continuously making tubular stock on said mandrel means so that said tubular stock continuously moves on said mandrel means in one direction, means for serially cutting said tubular stock on said mandrel means into elongated lengths, first means for serially advancing each elongated length away from said cutting means in said one direction and on said mandrel means to a first station on said mandrel means at a rate faster than movement of said tubular stock in said one direction, second means for serially advancing each elongated length away from said first station in said one direction and on said mandrel means to a second station on said mandrel means, and means for serially cutting each elongated length at said second station into individual members on said mandrel means, said mandrel means having a straight longitudinal axis and said tubular stock having its longitudinal axis coinciding with said axis of said mandrel means throughout the entire movement of said tubular stock and parts thereof from said first-named means to said last-named means, said second advancing means including movable pushers adapted to respectively engage said elongated lengths.

References Cited by the Examiner

UNITED STATES PATENTS

| 1,491,140 | 4/1924 | Holt | 93—80 |
| 2,623,443 | 12/1952 | Robinson | 93—80 |
| 2,699,099 | 1/1955 | Robinson | 93—80 |

FRANK E. BAILEY, *Primary Examiner.*